US011376746B2

(12) United States Patent
Cerruti et al.

(10) Patent No.: US 11,376,746 B2
(45) Date of Patent: Jul. 5, 2022

(54) HAND INTENDED TO EQUIP A HUMANOID ROBOT

(71) Applicants: SOFTBANK ROBOTICS EUROPE, Paris (FR); CENTRE NATIONAL DE LA RECHERCHE SCIENTIFIQUE

(72) Inventors: Giulio Cerruti, Paris (FR); Damien Chablat, La Chapelle sur Erdre (FR); Vincent Clerc, Clamart (FR); David Gouaillier, Saint-Jean de Boiseau (FR)

(73) Assignees: SOFTBANK ROBOTICS EUROPE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 851 days.

(21) Appl. No.: 16/315,570

(22) PCT Filed: Jul. 4, 2017

(86) PCT No.: PCT/EP2017/066555
§ 371 (c)(1),
(2) Date: Jan. 4, 2019

(87) PCT Pub. No.: WO2018/007346
PCT Pub. Date: Jan. 11, 2018

(65) Prior Publication Data
US 2019/0224856 A1    Jul. 25, 2019

(30) Foreign Application Priority Data
Jul. 5, 2016 (FR) ......................... 1656434

(51) Int. Cl.
*B25J 15/00* (2006.01)
*B25J 15/02* (2006.01)

(52) U.S. Cl.
CPC ......... *B25J 15/0009* (2013.01); *B25J 15/022* (2013.01); *B25J 15/0233* (2013.01)

(58) Field of Classification Search
CPC .. B25J 15/0009; B25J 15/022; B25J 15/0233; B25J 15/0213; B25J 15/1075; B25J 15/1045
(Continued)

(56) References Cited

U.S. PATENT DOCUMENTS 1,507,682 A * 9/1924 Pecorella ................ A61F 2/583
623/64
4,946,380 A * 8/1990 Lee .......................... A61F 2/583
294/111
(Continued)

FOREIGN PATENT DOCUMENTS

CN    101722514 A    6/2010
CN    102873689 A    1/2013
(Continued)

OTHER PUBLICATIONS

Lee, et al., "A biomimetic hand employing a dual actuation scheme", Journal of Mechanical Science and Technology, vol. 26, Issue 12, pp. 4131-4139, Jan. 13, 2013.
(Continued)

*Primary Examiner* — Paul T Chin
(74) *Attorney, Agent, or Firm* — BakerHostetler

(57) ABSTRACT

A hand intended to equip a humanoid robot, the hand includes a palm and at least one finger extending along a first axis, the hand being capable of picking up an object, the finger comprising a first phalanx linked to the palm by a first motorized pivot link and a second phalanx consecutive to the first phalanx linked to the first phalanx by a second pivot link. The finger comprises a first mechanism linking the palm to the second phalanx configured such that the rotation
(Continued)

of the first phalanx about the second axis causes the second phalanx to rotate about the third axis, and a second mechanism linking the palm to each of the phalanges configured to actuate the finger in such a way that the finger wraps around the object to be picked up, and the second mechanism is configured to deform the first mechanism.

9 Claims, 6 Drawing Sheets

(58) Field of Classification Search
USPC .......................................................... 294/111
See application file for complete search history.

(56) References Cited

U.S. PATENT DOCUMENTS

| | | | | |
|---|---|---|---|---|
| 5,062,673 | A * | 11/1991 | Mimura | B25J 15/0009 294/111 |
| 5,378,033 | A * | 1/1995 | Guo | A61F 2/586 294/116 |
| 5,570,920 | A * | 11/1996 | Crisman | B25J 9/104 294/111 |
| 6,896,704 | B1 * | 5/2005 | Higuchi | A61F 2/70 623/64 |
| 8,690,212 | B2 * | 4/2014 | Lee | B25J 9/103 294/111 |
| 8,991,884 | B2 * | 3/2015 | DeLouis | B25J 15/0009 294/111 |
| 2004/0054424 | A1 * | 3/2004 | Matsuda | B25J 15/0009 623/64 |
| 2009/0015026 | A1 * | 1/2009 | Matsuda | B25J 15/0009 294/106 |
| 2011/0144770 | A1 | 6/2011 | Moyer et al. | |
| 2011/0163561 | A1 * | 7/2011 | Kim | B25J 9/104 294/111 |

FOREIGN PATENT DOCUMENTS

| | | |
|---|---|---|
| CN | 102896636 A | 1/2013 |
| EP | 1 457 294 A1 | 9/2004 |
| JP | 2004-41279 A | 2/2004 |
| JP | 2012-85992 A | 5/2012 |

OTHER PUBLICATIONS

Cerruti, et al., "Design method for an anthropomorphic hand able to gesture and grasp", 2015 IEEE International Conference on Robotics and Automation, pp. 3660-3667, May 26, 2015.

Kim, et al., "RoboRay hand: A highly backdrivable robotic hand with sensorless contact force measurements", 2014 IEEE International Conference on Robotics and Automation (ICRA), pp. 6712-6718, May 31, 2014.

Zhang, et al., "A Dexterous and Self-adaptive Humanoid Robot Hand: Gesture-Changeable Under-Actuated Hand", Intelligent Robotics and Applications, pp. 515-525, Dec. 16, 2009.

* cited by examiner

HAND INTENDED TO EQUIP A HUMANOID ROBOT

CROSS-REFERENCE TO RELATED APPLICATIONS

This application is a National Stage of International patent application PCT/EP2017/066555, filed on Jul. 4, 2017, which claims priority to foreign French patent application No. FR 1656434, filed on Jul. 5, 2016, the disclosures of which are incorporated by reference in their entirety.

FIELD OF THE INVENTION

The invention relates to a hand intended to equip a humanoid robot. More specifically, it relates to a hand whose fingers can both be displaced and grasp an object.

BACKGROUND

The human hand is a part of the human body that is extremely complex. It comprises several fingers articulated around the palm of the hand. Moreover, each finger has several mutually articulated phalanges. Each articulation is mobile by means of muscles. The various articulations of the hand allow objects of various forms to be gripped. The relative position of the fingers and of the palm also makes it possible to produce signs or symbols allowing a message to be communicated, for example the index finger extended to designate an object or a direction, the thumb extended to signify an approval, etc. Mastering the movements of the fingers of the hand is therefore of particular interest for reinforcing the humanoid character of a robot and its interaction capabilities. One difficulty lies in the large number of actuators that are necessary to ensure the independent control of the movements of the fingers.

It is unrealistic to independently control the movement of each of the phalanges of each of the fingers of the hand, both for the gripping of objects and for the communication of a visual message. The aim in practice is to give the greatest number of possibilities of movements with the smallest number of actuators. As is known, a mechanism is said to be underactuated when the number of drivable actuators A is less than the number of degrees of freedom N, i.e. when N>A. The degree of underactuation is then defined as the difference (N–A). An underactuated hand is for example known in which four fingers with three phalanges and one finger with two phalanges can be closed by a single actuator. By allowing the control of fourteen degrees of freedom—via fourteen pivot links—by means of a single actuator, such a hand exhibits a high degree of underactuation.

Attempts have been made to improve the capacity to control a hand by conserving a high degree of underactuation of the hand. The implementation of a spreader bar is for example known, arranged between the actuator and the fingers so as to distribute the gripping effort over each of the fingers. The hand can thus, by means of a single actuator, grasp objects of various forms. The hand can however be controlled only between an open position and a closed position; the respective position of each of the fingers in closed position depending on the form of the object grasped. If no object is interposed between the fingers, the latter close to a position representing a closed fist.

To reinforce the humanoid character and the interaction capabilities of a robot, it remains desirable to increase the possibilities of controlling the movements of a hand while conserving a high degree of underactuation. Obviously, the solution will have to be able to fit into the structural and functional environment of the robot.

SUMMARY OF THE INVENTION

To this end, the subject of the invention is a hand intended to equip a humanoid robot, the hand comprising a palm and at least one finger extending along a first axis, the hand being able to grasp an object, the finger comprising a first phalanx linked to the palm by a first pivot link motorized so as to render the first phalanx rotationally mobile about a second axis substantially at right angles to the first axis, and a second phalanx consecutive to the first phalanx linked to the first phalanx by a second pivot link pivoting about a third axis substantially parallel to the second axis, characterized in that the finger comprises:

a first mechanism linking the palm to the second phalanx configured in such a way that the rotation of the first phalanx about the second axis generates the rotation of the second phalanx about the third axis, a second mechanism linking the palm to each of the phalanges configured to actuate the finger in such a way that the finger wraps around the object to be grasped, and in that the second mechanism is configured to deform the first mechanism.

Advantageously, the finger comprises a third phalanx consecutive to the second phalanx linked to the second phalanx by a third pivot link pivoting about a fourth axis substantially parallel to the third axis, and the first mechanism is configured in such a way that the rotation of the first phalanx about the second axis generates the rotation of the third phalanx about the fourth axis.

Advantageously, the first mechanism comprises a first bar having a first end and a second end, the first end of the first bar being pivot-linked about a fifth axis parallel to the second axis, distinct from the second axis and rotationally mobile about the second axis and the second end of the first bar being pivot-linked about a sixth axis parallel to the third axis, distinct from the third axis and rotationally mobile about the third axis, a second bar having a first end and a second end, the first end of the second bar being pivot-linked about a seventh axis parallel to the third axis, distinct from the third and sixth axes and rotationally mobile about the third axis and the second end of the second bar being pivot-linked about an eighth axis parallel to the fourth axis, distinct from the fourth axis and rotationally mobile about the fourth axis, and the first bar and the second bar are elastic bars, one of the bars being configured to be compressed when the second mechanism actuates the finger and generates a force on the adjacent phalanx below a threshold value and to buckle when the second mechanism actuates the finger and generates a force on the adjacent phalanx above the threshold value, deforming the first mechanism.

According to one embodiment, the second mechanism comprises a cable extending from the third phalanx to the palm, each of the phalanges being able to be displaced relative to the palm by driving of the cable.

Advantageously, at least one of the phalanges comprises a guide channel intended to guide the cable between the third phalanx and the palm.

According to another embodiment, the first bar and the second bar have a different elasticity, and the elasticity of the first bar is lesser than the elasticity of the second bar.

According to another embodiment, the first bar and the second bar have a different elasticity, and the elasticity of the first bar is greater than the elasticity of the second bar.

Advantageously, the first bar and the second bar are made of elastomer.

Advantageously, the first bar and the second bar have a square section.

According to a particularly advantageous embodiment, the hand according to the invention comprises a plurality of fingers and a motorization means configured to exert a force on each of the cables of the plurality of fingers so as to displace each of the phalanges of the plurality of fingers to actuate the plurality of fingers in such a way that the plurality of fingers wraps around the object to be grasped, and a differential mechanism intended to distribute the force exerted by the motorization means over each of the cables of the plurality of fingers.

The invention relates also to a humanoid robot equipped with a hand having the features described previously.

BRIEF DESCRIPTION OF THE DRAWINGS

The invention will be better understood and other advantages will become apparent on reading the detailed description of an embodiment given by way of example in the following figures.

In the interests of clarity, the same elements will bear the same references in the different figures.

DETAILED DESCRIPTION

Figure 1A:
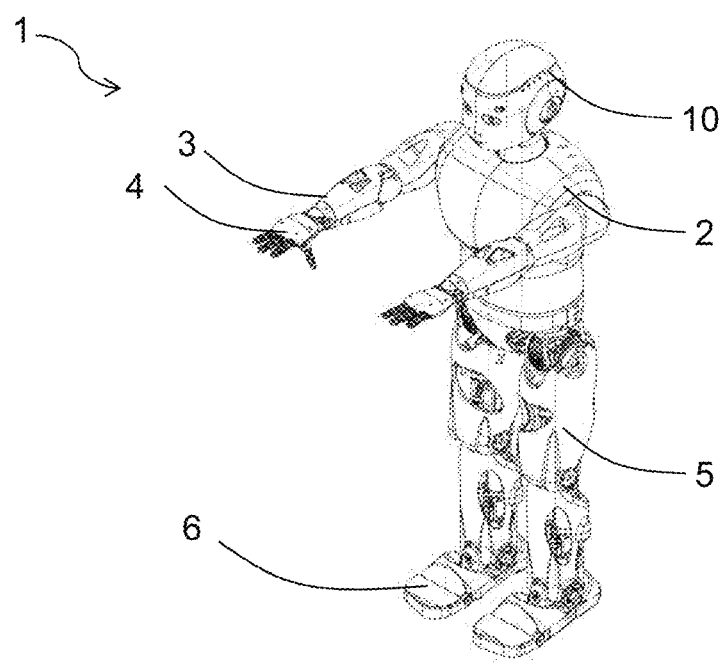
FIGS. 1a and 1b represent two examples of humanoid robots that can be equipped with two hands according to the invention.
Figure 1B:
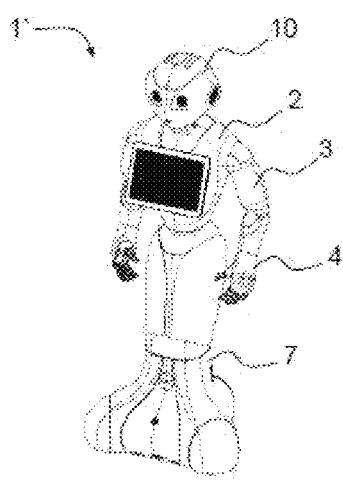

FIGS. 1a and 1b represent two examples of humanoid robots developed by the applicant. The humanoid robot 1 represented in FIG. 1a comprises a head 10, a trunk 2, two arms 3, two hands 4, two legs 5 and two feet 6. The humanoid robot 1' represented in FIG. 1b comprises a head 10, a trunk 2, two arms 3, two hands 4 and a skirt 7. The invention relates to a hand that can equip these types of humanoid robots.

The invention is described hereinbelow in the particular case of a hand 4 comprising a finger 20 implanted in a palm, for example the index finger, the middle finger, the ring finger or the little finger. The explanations are limited to just one of these fingers in order to simplify the understanding of the invention. It is clearly evident that the hand 4 can comprise several fingers 20 positioned one alongside the other, ideally four to represent the index finger, the middle finger, the ring finger and the little finger. The invention applies also to a hand also comprising a thumb. Since the thumb has two more degrees of rotational freedom than the other fingers, it requires two additional motorization means and the invention applies likewise to the thumb.

It is clearly understood that the invention more widely covers a hand comprising a palm and several motorized fingers that make it possible, in the way of a human being, to displace the fingers relative to the palm. Furthermore, the invention is implemented in a hand to reinforce the humanoid character of the robot, for example by allowing an enhanced visual communication. It is understood that the invention can be implemented according to the same principle and with the same benefits for other members, for example a humanoid robot foot or a paw of a robot with animal character. Hereinbelow, the term hand generally denotes a member comprising a palm and fingers that are motorized relative to the palm.

Figure 2:
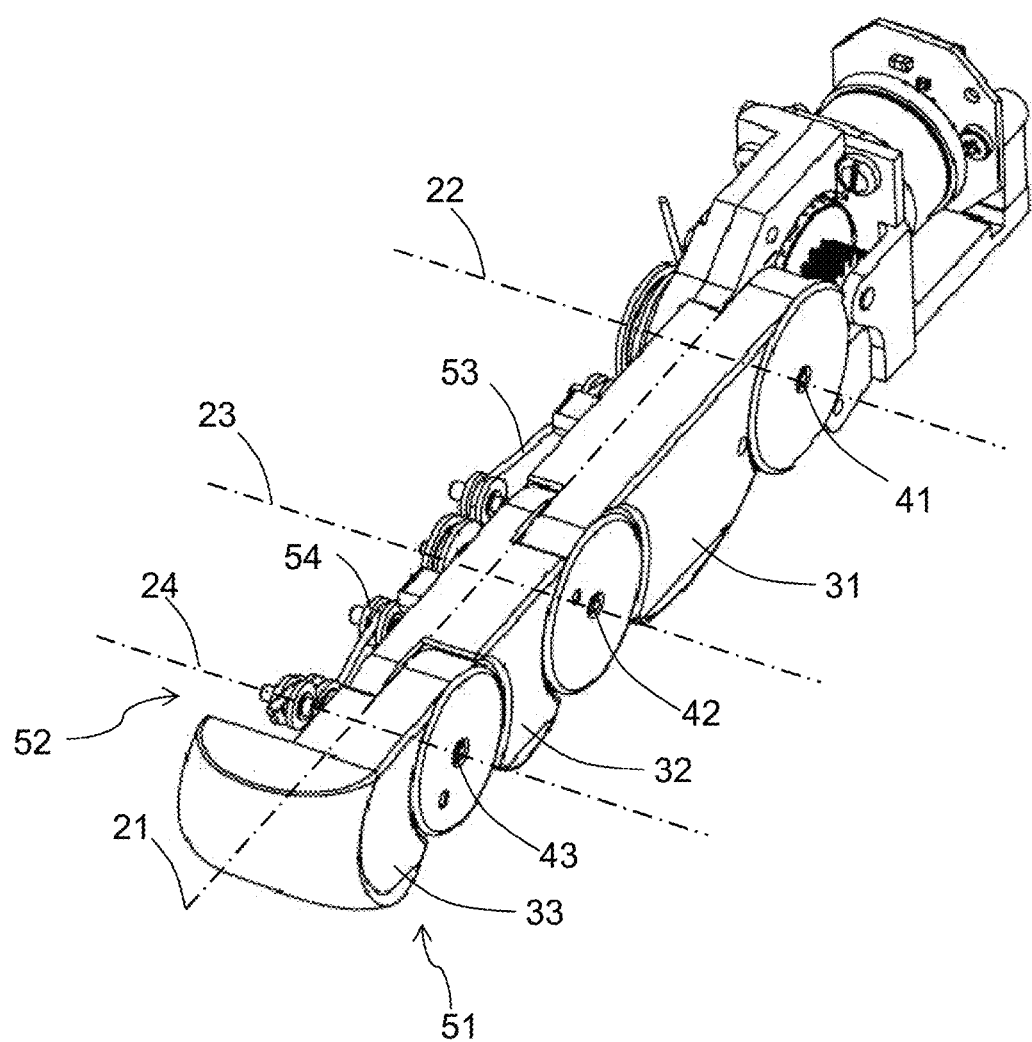
FIG. 2 represents an example of a finger of a hand of a humanoid robot according to the invention.

FIG. 2 represents an example of a finger of a hand of a humanoid robot according to the invention. The hand is intended to equip a humanoid robot, the hand comprising a palm (not represented in FIG. 2) and at least one finger 20 extending along a first axis 21, the hand being able to grasp an object, the finger 20 comprising a first phalanx 31 linked to the palm by a first pivot link 41 motorized so as to render the first phalanx 31 rotationally mobile about a second axis 22 substantially at right angles to the first axis 21, and a second phalanx 32 consecutive to the first phalanx 31 linked to the first phalanx 31 by a second pivot link 42 pivoting about a third axis 23 substantially parallel to the second axis 22. According to the invention, the finger 20 comprises a first mechanism 51 linking the palm to the second phalanx 32 configured in such a way that the rotation of the first phalanx 31 about the second axis 22 generates the rotation of the second phalanx 32 about the third axis 23. The finger 20 also comprises a second mechanism 52 linking the palm to each of the phalanges 31, 32 configured to actuate the finger 20 in such a way that the finger 20 wraps around the object to be grasped. Also, according to the invention, the second mechanism 52 is configured to deform the first mechanism 51.

The invention applies to a hand with at least one finger. The hand can have two, three or four fingers. Advantageously, the hand has five fingers, in order to resemble a human hand. Among these five fingers, there are the index finger, the middle finger, the ring finger, the little finger, which are reproduced by the finger 20 according to the invention. The fifth finger is the thumb, also reproduced by the finger 20 but to which other degrees of freedom must be added to allow the additional mobility of a thumb. This aspect will not be treated in the invention, but the invention applies likewise to a thumb and it is sufficient to add two motorization means to the thumb to obtain the desired degrees of freedom.

The finger 20 can comprise two phalanges 31, 32. It can, on the same principle, comprise three, four or even more thereof, by applying the same principle of the first and second phalanges to the consecutive phalanges. In this application, and by way of example, a finger with three phalanges is represented in the interests of best reproducing a human finger, but it is clearly evident that the invention is not limited to the case of a hand with fingers with three phalanges.

Thus, as can be seen in FIG. 2, the finger 20 comprises a third phalanx 33 consecutive to the second phalanx 32 linked to the second phalanx 32 by a third pivot link 43 pivoting about a fourth axis 24 substantially parallel to the third axis 23, and the first mechanism 51 is configured in such a way that the rotation of the first phalanx 31 about the second axis 22 generates the rotation of the third phalanx 33 about the fourth axis 24.

The second mechanism 52 comprises a cable 53 extending from the third phalanx 33 to the palm, each of the phalanges 33, 32, 31 being able to be displaced relative to the palm by driving of the cable 53. More generally, the cable 53 extends from the phalanx furthest away from the palm to the palm.

Advantageously, at least one of the phalanges, for example the second phalanx 32, comprises a guide channel 54 intended to guide the cable 53 between the third phalanx 33 and the palm. The presence of the guide channel 54 on the second phalanx 32 is one example. The invention relates also to a configuration with a guide channel on another phalanx, for example the first phalanx or advantageously on each of the phalanges. It is also possible to have several guide channels per phalanx.

Figure 3:
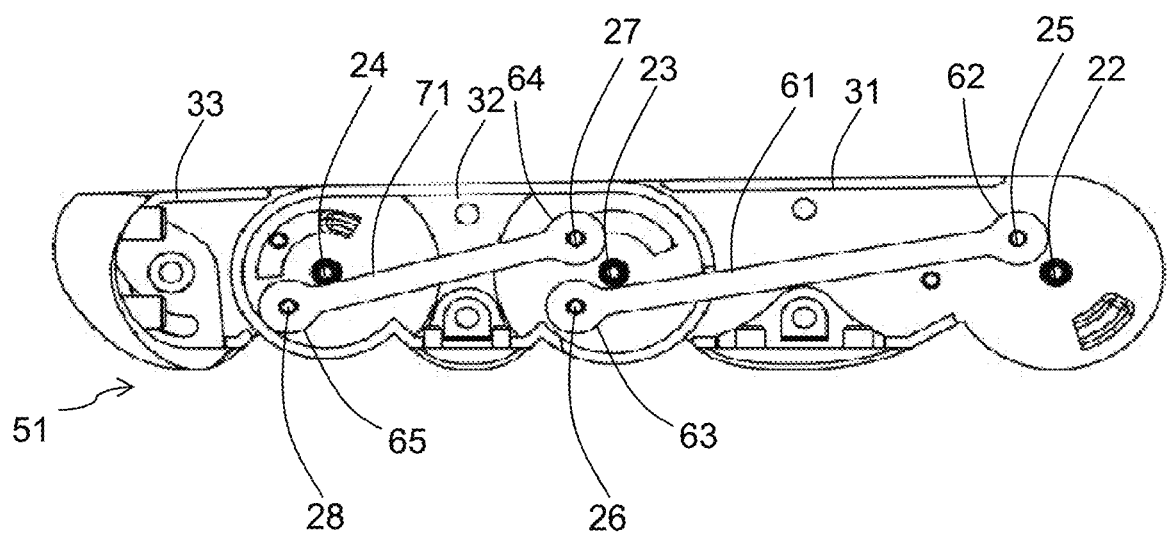
FIG. 3 represents a view of a finger of a humanoid robot composed of several phalanges, the first mechanism being made visible.

FIG. 3 represents a view of a finger 20 of a humanoid robot composed of several phalanges, the first mechanism 51 being made visible. According to the invention, the first mechanism 51 comprises a first bar 61 having a first end 62 and a second end 63, the first end 62 of the first bar 61 being pivot-linked about a fifth axis 25 parallel to the second axis 22, distinct from the second axis 22 and rotationally mobile about the second axis 22 and the second end 63 of the first bar 61 being pivot-linked about a sixth axis 26 parallel to the third axis 23, distinct from the third axis 23 and rotationally mobile about the third axis 23. The first mechanism 51 comprises a second bar 71 having a first end 64 and a second end 65, the first end 64 of the second bar 71 being pivot-linked about a seventh axis 27 parallel to the third axis 23, distinct from the third 23 and sixth 26 axes and rotationally mobile about the third axis 23 and the second end 65 of the second bar 71 being pivot-linked about an eighth axis 28 parallel to the fourth axis 24, distinct from the fourth axis 24 and rotationally mobile about the fourth axis 24.

According to the invention, the first bar 61 and the second bar 71 are elastic bars, one of the bars being configured to be compressed when the second mechanism 52 actuates the finger 20 and generates a force on the adjacent phalanx below a threshold value and to buckle when the second mechanism 52 actuates the finger 20 and generates a force on the adjacent phalanx above the threshold value, deforming the first mechanism 51. The interaction between the second mechanism 52 and the first mechanism 51 is broached a little later in the description.

Figure 4:
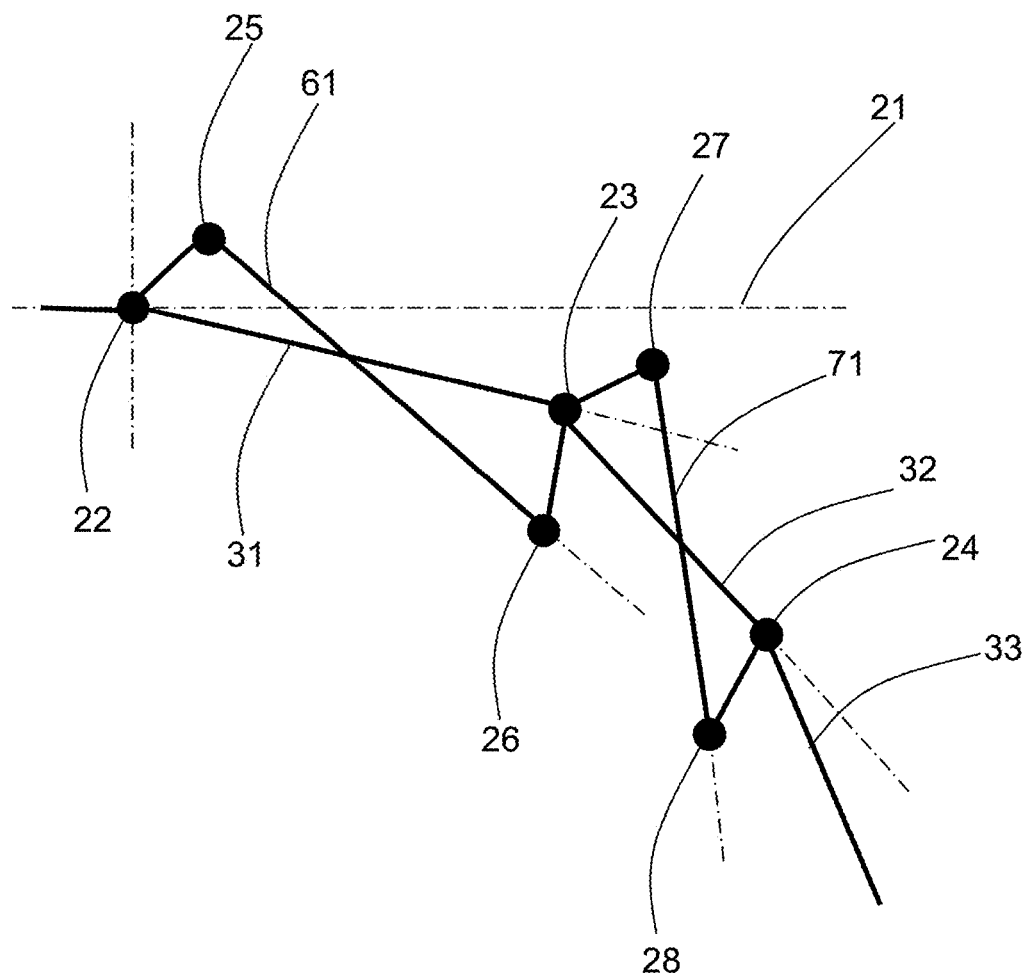
FIG. 4 represents the kinematic model of the first mechanism.

FIG. 4 represents the kinematic model of the first mechanism 51. The kinematic model makes it possible to clearly see the positioning of the first axis 21 and of the axes 22 to 28, that are mutually parallel. Similarly, the phalanges 31, 32, 33 can be seen linked to one another by pivot links pivoting about axes 23, 24, the first phalanx 31 being linked to the palm by a pivot link pivoting about the axis 22. Finally, the two bars 61 and 71 of the first mechanism 51 can be seen. The ends of each of the bars are rotationally mobile about the axis 22 and the axis 23 for the first bar 61 and about the axes 23 and 24 for the second bar 71. In other words, the ends of each bar 61, 71 correspond to double pivot links, for example the first end 62 of the first bar 61 is rotationally mobile about the axis 25 and also rotationally mobile about the axis 22. Thus, the first mechanism 51 forms part of a set of two quadrilaterals. The first quadrilateral is formed by the first phalanx 31, the first bar 61 and the radius between the axis 22 and the axis 25 and the radius between the axis 23 and the axis 26. Similarly, the second quadrilateral is formed by the second phalanx 32, the second bar 71 and the radius between the axis 23 and the axis 27 and the radius between the axis 24 and the axis 28. The rotational driving of the first end 62 of the first bar 61 about the axis 22 therefore generates the movement of the first phalanx 31, which generates, by virtue of the kinematics of the finger, the rotation of the first end 64 of the second bar 71 about the axis 23 and therefore the movement of the second phalanx 32. Likewise, the third phalanx 33 is set in motion by the rotation of its end about the axis 24.

Figure 5:
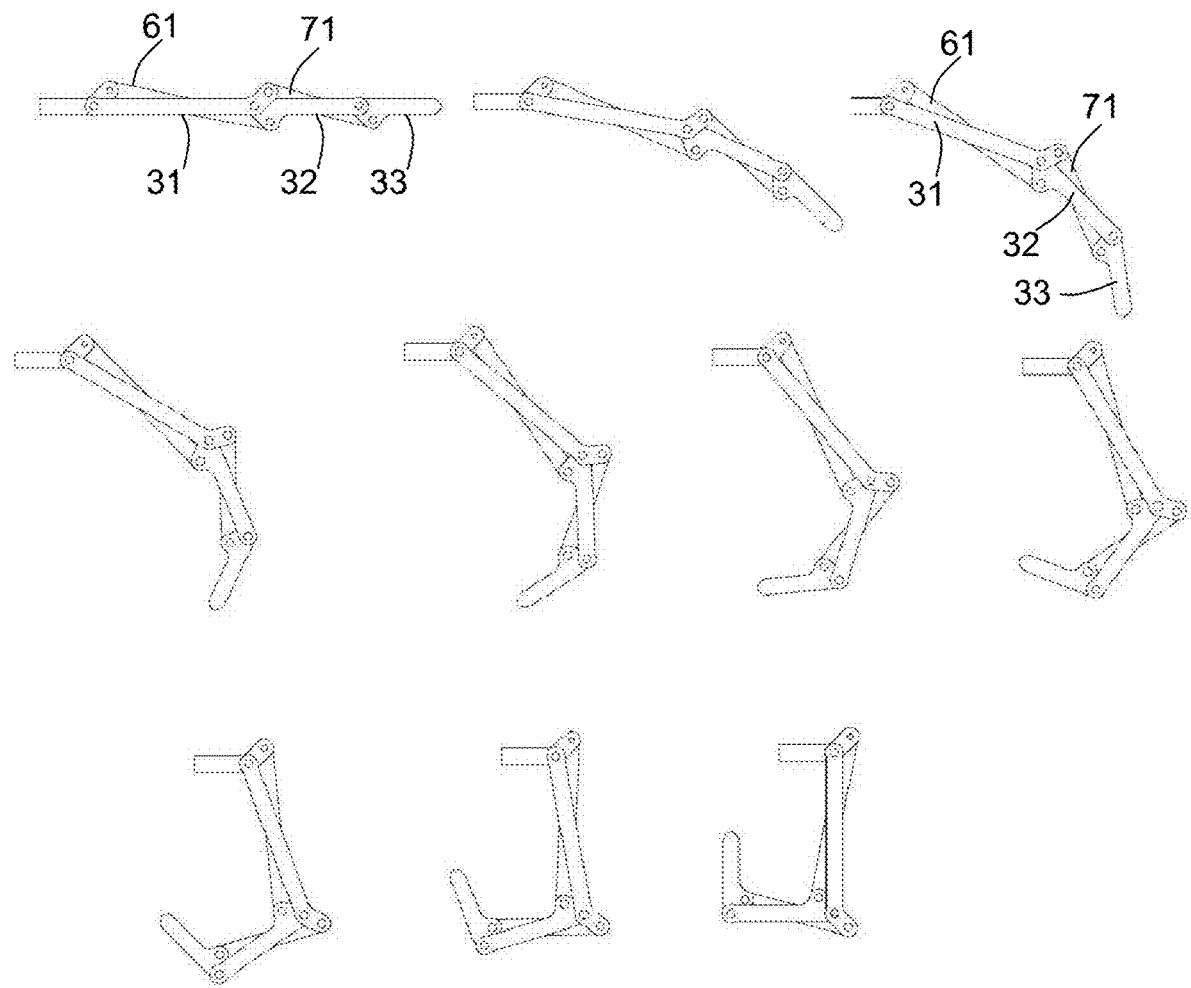
FIG. 5 illustrates the principle of the displacement of a finger of the hand by means of the first mechanism.

FIG. 5 illustrates the principle of the displacement of a finger of the hand by means of the first mechanism, from a so-called position of rest (angle between the palm and the first phalanx of 0°) to a closed finger position (angle between the palm and the first phalanx of 90°). In this figure, the two quadrilaterals mentioned in FIG. 4 are represented. Remember that a finger has only a single motorization, at the pivot link about the axis 22, to actuate the first mechanism 51. By virtue of the kinematics of the finger 20 as explained in FIG. 4, a single motorization therefore allows the movement of the finger 20 and the associated gesture. The displacement of the phalanges 31, 32, 33 is the consequence of the actuation of the motorized pivot link. The two quadrilaterals, linked at the axis 23, allow a combined movement of the bars 61 and 71 and therefore of the phalanges of the finger 20. The motorized pivot link controls the movement of the first quadrilateral, corresponding to the first phalanx 31, which causes the movement of the second quadrilateral, corresponding to the second phalanx 32.

The first mechanism 51 thus allows the finger 20 to be controlled globally and not phalanx by phalanx. The mobility of the phalanges takes place relative to one another. This mechanism allows a reduction of the number of actuators per finger, a reduction of the bulk of the phalanx actuation mechanisms and also a reduction of production and maintenance costs.

Figure 6:
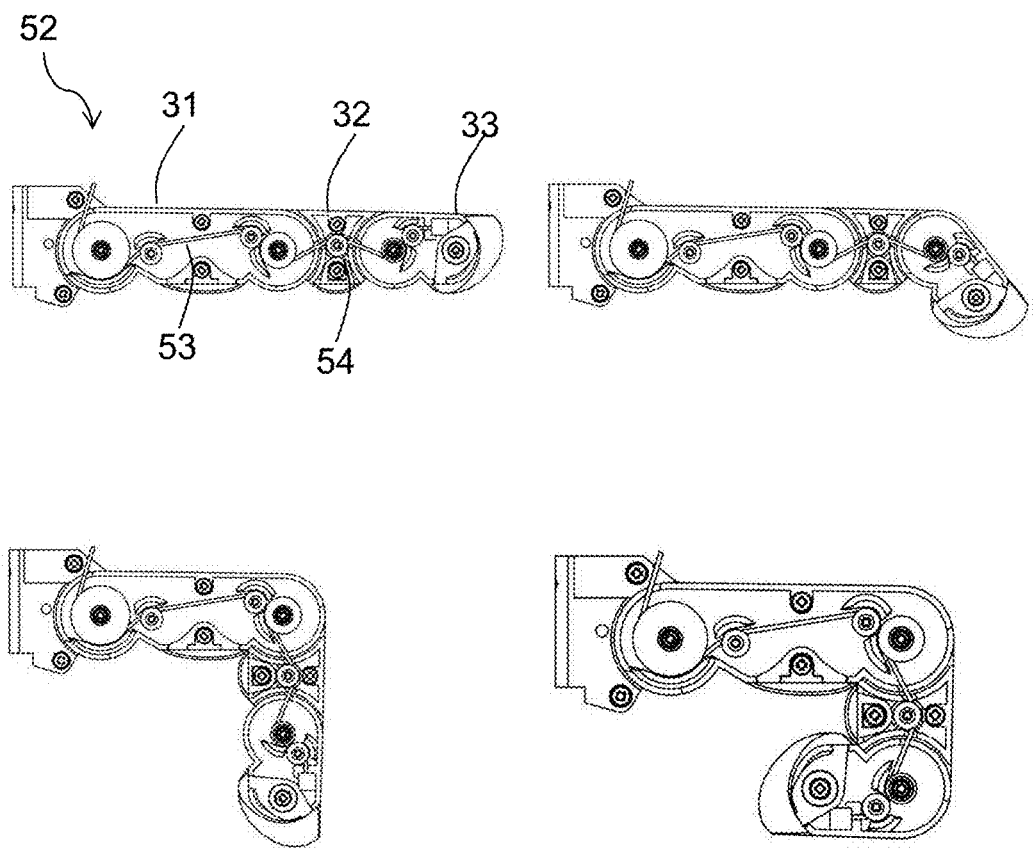
FIG. 6 illustrates the principle of displacement of a finger of the hand by means of the second mechanism.

FIG. 6 illustrates the principle of displacement of the finger 20 of the hand by means of the second mechanism 52. As described previously, the second mechanism 52 comprises a cable 53 extending from the third phalanx 33 to the palm, each of the phalanges 33, 32, 31 being able to be displaced relative to the palm by driving of the cable 53. More generally, the cable 53 extends from the phalanx furthest away from the palm to the palm. Various types of underactuated hand are known that seek to control, by means of a limited number of actuators, the greatest number of degrees of freedom of the fingers of the hand. In the invention, the hand comprises two mechanisms. As has been seen, the first mechanism 51 allows general gestures and the second mechanism 52 allows an object to be grasped. The invention relies on the fact that the two mechanisms 51, 52 are not actuated at the same time, but one after the other. In the phase of approach of the finger to an object, the first mechanism 51 is actuated to establish a contact with the object. Then, it is the second mechanism 52 which is actuated.

When the cable 53 is pulled, and with no opposition formed (that is to say without contact with an object or without any contact), the finger moves for example from a position of rest to a closed finger position.

Now, when the cable 53 is pulled, if an object is grasped, a phalanx, for example the first phalanx 31, enters into contact with the object and the object opposes the movement of the finger. The cable 53 is then pulled more strongly, and, since the object opposes the movement of the first phalanx 31, an axial compression force is applied to the first bar 61, which buckles. Once the bar is buckled, the first mechanism 51 is therefore deformed. The first mechanism 51 is decoupled from the second mechanism 52, which, itself, continues its action by pulling on the cable 53 for the phalanges 32, 33 to wrap around the object to grasp it.

The general idea of the present invention is to couple, for each finger 20, the rotational movement of the finger 20 relative to the palm and the grasping of an object while conserving an advantageous degree of underactuation with a view to installation in a humanoid robot. The invention consists in driving a finger from the position of rest on the first axis 21, by rotation of the motorized pivot link, to a position of contact with the object by implementation of the first mechanism 51 and to drive this finger from the position of contact with the object to the position of grasping of the object, that is to say when the finger wraps around the object to be grasped, by implementation of the second mechanism 52. The invention advantageously exploits the two mechanisms 51, 52 to allow two distinct movements of the finger, namely that of general movement of the finger and that of grasping of an object, while requiring only one motorization means per finger for the first mechanism 51 and one motorization means for all the fingers for the second mechanism 52.

As already stated, the first bar 61 and the second bar 71 are elastic bars. One of the bars, for example the first bar 61, is configured to be compressed when the second mechanism 52 actuates the finger 20. By actuating the finger 20, the second mechanism 52 tends to close the finger and acts as an external force applied to the second phalanx 32. In other words, by actuating the finger, the second mechanism 52 generates a force on the adjacent phalanx. As long as the value of the force applied to the phalanx 32 is below a threshold value, the finger continues its movement of closure, the bars 61, 71 continuing their rotational movement about their respective pivot links. The bar 61, by virtue of the kinematics of the quadrilaterals, is compressed. As soon as the value of the force applied to the phalanx 32 is above a threshold value, the compressed bar 61 buckles. In other words, the first mechanism 51 is deformed. Once the bar 61 is buckled, the finger 20 is actuated only by the second mechanism 52. The finger then wraps around the object to be grasped by implementation of the second mechanism 52. The phalanges 31, 32, 33 then close on the object to be grasped. The folding of the phalanges over the object is adapted to the size and to the form of the object to be grasped. In other words, the invention makes it possible, without the use of sensors and only by virtue of the design of the first mechanism 51, for the finger to be adapted to the form of the object and to exert an apportioned effort everywhere on the object.

More generally, for a bar, whether it be the first bar 61 or the second bar 71, an axial force along the bar varies from compression to stretching depending on the configuration of the finger 20. The bar of a phalanx is compressed each time an external force tries to close the adjacent phalanx. On the other hand, the bar is stretched when an external force pushes the phalanx of the bar to open.

Thus, to go back to the preceding example, once the finger is in the grasping position, that is to say when the finger wraps around the object following the buckling of the first bar 61 by implementation of the second mechanism 52, the object is grasped, the cable 53 is no longer pulled. There is then no longer any compression force applied to the bar 61. The bar 61 is stretched. Also, the first mechanism 51 reverts to its status before buckling of the bar 61.

By virtue of the principle of the invention, is therefore possible to activate the finger 20 in a general gesture with the first mechanism and in grasping with the second mechanism without any additional control device to switch from the first mechanism to the second mechanism and vice versa. The switch from the first mechanism to the second mechanism takes place through activation of the second mechanism which deforms the first mechanism by buckling of one of its bars. In order to have a good interaction between general gestures and grasping, a good dimensioning of the bars 61 and 71 is required first.

The bars 61 and 71 must be able to withstand the compression and stretching forces that they will be subjected to during their life. Each of the bars has an elasticity. The elasticity constants of the bars 61, 71 are such that the bars can withstand the compression forces without buckling when the buckling is not desired, but the bars 61, 71 must be able to buckle at a certain determined threshold value based on the configuration of the finger and on the forces applied to the finger. The bars must be fairly rigid to sustain the effort but not too rigid to not lose energy to counter the effort of the bars upon the activation of the second mechanism 52 for the grasping of an object.

The first bar 61 and the second bar 71 can have a different elasticity, and the elasticity of the first bar 61 can be lesser than the elasticity of the second bar 71. This configuration makes it possible to expend less energy in the movement of the finger. It is necessary to plan the elasticity of the bars such that each bar can support the weight of the corresponding phalanx itself, to counter gravity. When the cable 53 of the second mechanism 52 is pulled, the second bar 71 buckles more easily when an object opposes, which means that less force is needed to be applied to the bar to make it buckle.

Alternatively, the first bar 61 and the second bar 71 can have a different elasticity, and the elasticity of the first bar 61 can be greater than the elasticity of the second bar 71. This configuration allows a better adaptation of the finger to the form of the object. In effect, by actuating the cable 53, the bars 61 and 71 will be subjected to a certain axial compression force. The first bar 61 will buckle more easily than the second bar 71. The result thereof is a grasping of the object comparable to a grasping of an object by a human finger, with the second and third phalanges wrapping around the object to be grasped.

Very particular attention must therefore be paid to the dimensioning of the elasticity constants of the bars 61 and 71 as a function of their geometry and of the critical force desired beyond which each bar buckles.

Advantageously, the first bar 61 and the second bar 71 are made of elastomer.

The first bar 61 and the second bar 71 advantageously have a square section to facilitate the manufacture thereof on an industrial scale, for example by laser cutting or by waterjets.

The hand according to the invention comprises a motorization means configured to exert a force on each of the cables 53 of the plurality of fingers 20 so as to displace each of the phalanges 31, 32, 33 of the plurality of fingers 20 to actuate the plurality of fingers in such a way that the plurality of fingers wraps around the object to be grasped. Advantageously, the hand can comprise a differential mechanism intended to distribute the force exerted by the motorization means over each of the cables of the plurality of fingers.

Thus, in an underactuated hand, such as that of the invention, limiting to the maximum the number of actuators, the cables 53 of each of the fingers 20 are linked to a single actuator, or motorization means, capable of simultaneously displacing all of the fingers 20 from the position of rest to a position of grasping of an object. To allow objects of various forms to be gripped, consideration has also been given, as mentioned previously, to interposing a differential mechanism, for example a spreader bar, between the motorization means and the cables 53 of each of the fingers 20, so as to distribute the pulling force transmitted to the different cables 53.

The invention relates also to a humanoid robot equipped with a hand as described previously, as represented in FIGS. 1a and 1b.

The invention claimed is:

1. A hand intended to equip a humanoid robot, the hand comprising a palm and at least one finger extending along a first axis, the hand being able to grasp an object, the finger comprising a first phalanx linked to the palm by a first pivot link motorized so as to render the first phalanx rotationally mobile about a second axis substantially at right angles to the first axis, and a second phalanx consecutive to the first phalanx linked to the first phalanx by a second pivot link pivoting about a third axis substantially parallel to the second axis, wherein the finger comprises:

a first mechanism linking the palm to the second phalanx configured in such a way that the rotation of the first phalanx about the second axis generates the rotation of the second phalanx about the third axis, a second mechanism linking the palm to each of the phalanges configured to actuate the finger in such a way that the finger wraps around the object to be grasped, and in that the second mechanism is configured to deform the first mechanism, in that the finger comprises a third phalanx consecutive to the second phalanx linked to the second phalanx by a third pivot link pivoting about a fourth axis substantially parallel to the third axis, in that the first mechanism is configured in such a way that the rotation of the first phalanx about the second axis generates the rotation of the third phalanx about the fourth axis, in that the first mechanism comprises:

a first bar having a first end and a second end, the first end of the first bar being pivot-linked about a fifth axis parallel to the second axis, distinct from the second axis and rotationally mobile about the second axis and the second end of the first bar being pivot-linked about a sixth axis parallel to the third axis, distinct from the third axis and rotationally mobile about the third axis, a second bar having a first end and a second end, the first end of the second bar being pivot-linked about a seventh axis parallel to the third axis, distinct from the third and sixth axes and rotationally mobile about the third axis and the second end of the second bar being pivot-linked about an eighth axis parallel to the fourth axis, distinct from the fourth axis and rotationally mobile about the fourth axis, and in that the first bar and the second bar are elastic bars, one of the bars being configured to be compressed when the second mechanism actuates the finger and generates a force on the consecutive phalanx below a threshold value and to buckle when the second mechanism actuates the finger and generates a force on the consecutive phalanx above the threshold value, deforming the first mechanism.

2. The hand as claimed in claim 1, wherein the second mechanism comprises a cable extending from the third phalanx to the palm, each of the phalanges being able to be displaced relative to the palm by driving of the cable.

3. The hand as claimed in claim 2, wherein at least one of the phalanges comprises a guide channel intended to guide the cable between the third phalanx and the palm.

4. The hand as claimed in claim 2, comprising a plurality of fingers wherein the first bar and the second bar have a different elasticity, and in that the elasticity of the first bar is lesser than the elasticity of the second bar and further comprising:

a motorization means configured to exert a force on each of the cables of the plurality of fingers so as to displace each of the phalanges of the plurality of fingers to actuate the plurality of fingers in such a way that the plurality of fingers wraps around the object to be grasped, a differential mechanism intended to distribute the force exerted by the motorization means over each of the cables of the plurality of fingers.

5. A humanoid robot equipped with a hand as claimed in claim 4.

6. The hand as claimed in claim 1, wherein the first bar and the second bar have a different elasticity, and in that the elasticity of the first bar is lesser than the elasticity of the second bar.

7. The hand as claimed in claim 1, wherein the first bar and the second bar have a different elasticity, and in that the elasticity of the first bar is greater than the elasticity of the second bar.

8. The hand as claimed in claim 1, wherein the first bar and the second bar are made of elastomer.

9. The hand as claimed in claim 1, wherein the first bar and the second bar have a square section.

* * * * *